United States Patent
Balling

[11] Patent Number: 5,754,910
[45] Date of Patent: May 19, 1998

[54] CAMERA HAVING FILM CONTOUR AIDS

[75] Inventor: Edward Norman Balling, Rochester, N.Y.

[73] Assignee: Eastman Kodak Company, Rochester, N.Y.

[21] Appl. No.: 874,546

[22] Filed: Jun. 13, 1997

Related U.S. Application Data

[63] Continuation of Ser. No. 635,045, Apr. 19, 1996, abandoned.
[51] Int. Cl.[6] .................................................. G03B 17/02
[52] U.S. Cl. .................................. 396/536; 396/535
[58] Field of Search ............................ 396/387, 411, 396/535, 536, 538

[56] References Cited

U.S. PATENT DOCUMENTS

| | | |
|---|---|---|
| 2,000,588 | 5/1935 | Fuerst . |
| 3,550,512 | 12/1970 | Lange . |
| 3,967,300 | 6/1976 | Oshima . |
| 4,290,676 | 9/1981 | Hozman et al. . |
| 4,812,863 | 3/1989 | Ohmura et al. . |
| 4,833,495 | 5/1989 | Ohmura et al. . |
| 4,855,774 | 8/1989 | Ohmura et al. . |
| 5,248,108 | 9/1993 | Zander . |

FOREIGN PATENT DOCUMENTS

7-251334  10/1995  Japan .

*Primary Examiner*—Safet Metjahic
*Assistant Examiner*—Nicholas Tuccillo
*Attorney, Agent, or Firm*—Robert Luke Walker

[57] ABSTRACT

A camera includes a body having a film roll chamber and a film cassette chamber which are oppositely disposed relative to an exposure chamber. A rear cover which lighttightly seals the camera body includes a rib member projecting from an interior surface for contacting a filmstrip being advanced between the film roll chamber and the film cartridge chamber. The rib member is preferably curved to induce a constant curvature on the filmstrip as the filmstrip is advanced across the exposure chamber of the camera. A set of spherical protrusions projecting from the interior of the rear cover bound the exposure chamber to allow the edges of the filmstrip to more closely track the film rails which border the exposure chamber to guide the filmstrip and promote a repeatable contour in the exposure plane.

5 Claims, 9 Drawing Sheets

CAMERA HAVING FILM CONTOUR AIDS

This is a Continuation of application Ser. No. 08/635,045, filed 19 Apr. 1996 now abandoned.

FIELD OF THE INVENTION

The invention relates generally to the field of photography, and in particular to still photographic cameras. More specifically, the invention relates to apparatus incorporated into a camera for providing an improved film contour, particularly in the exposure area, which is useful for thinner filmstrips having inherently variable curvatures.

BACKGROUND OF THE INVENTION

There is an ever increasing desire in the very competitive field of consumer photography to produce cameras which are compact to provide increased ease of use for the user. There is an equal desire in the field to provide greater capability by increasing the amount of exposures which can be taken. A necessary tension develops when attempting to achieve each of these objectives; that is, to produce a camera capable of producing a greater number of exposures, while simultaneously optimizing compactness in the same camera.

One way of obtaining both of the above listed goals is to provide a thinner filmstrip, thereby allowing a greater number of exposures to be wound into a known diameter of a film roll. In this manner, the sizes of a film cartridge and associated film take-up spool housing the film roll are not affected, allowing the camera to maintain the same thickness.

A problem in developing thinner filmstrips, however, is that these films exhibit a greater propensity for adopting variable curvatures as a result of decreased rigidity and therefore are more easily affected by tensioning buildups in winding, and environmental factors such as humidity, among other factors. This problem is additionally compounded in so-called pre-wind cameras in which the filmstrip is prewound from the film cartridge or cassette into a film roll and placed in another chamber of the camera for advancing back into the film cartridge. Examples of pre-wind cameras are becoming more easily recognizable, such as the so-called single-use or one time use cameras manufactured by the Eastman Kodak Company and Fuji Photo Film Co. Ltd., among others.

As noted, the amount of curvature adopted by the film is variable, and accentuated in some cases. Such effects, if uncorrected, can create difficulty in placing the unexposed filmstrip in a desirable position in the film exposing position, in that variable curvature can affect the focal length distance between the taking lens of the camera and the film plane, (often referred to as the exposure gate), causing poorer quality pictures, and creating customer dissatisfaction.

There is a need, therefore, to provide means within the camera for correcting variable and accentuated film curvatures, particularly for thinner filmstrips, to provide repeatable film contour, particularly in the exposure gate of the camera.

SUMMARY OF THE INVENTION

The present invention is directed to overcoming one or more of the problems set forth above. Briefly summarized, and according to one aspect of the present invention, there is provided a camera comprising a body having a film roll chamber for retaining a roll of unexposed film, an exposure chamber, and a film cartridge chamber sized for retaining a film cassette, in which a filmstrip is advanced between the film roll chamber and the film cassette chamber across the exposure chamber, and a cover for lighttightly sealing the body, said exposure chamber having a set of bordering film rails for guiding the filmstrip between said chambers, characterized by:

film curvature correcting means including a rib member extending from the interior of the cover for inducing a constant curvature on the filmstrip prior to said filmstrip advancing into the exposure area, and a set of spherical protrusions extending from the cover for engaging edges of the corrected filmstrip to guide the filmstrip along the film rails.

An advantage realized by the present invention is that variable amounts of curvature between film rolls can be accounted for and corrected to allow the film to adopt a repeatable contour. In this manner, thinner films can more easily be assimilated, particularly in single-use cameras.

A further advantage of the present invention is that by controlling contour of the film, the focal length distance between the taking lens and the film plane can be held to a tighter tolerance, thereby resulting in sharper focus and detailed contrast in prints resulting from the exposing of the film.

A further advantage realized by the present invention is that an improved ability to hold the filmstrip in a repeatable contour improves manufacturing and quality.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

Though the following discussion is related to a preferred embodiment suitable for a particular single-use camera, it will become readily apparent, that the concepts described herein should not be limited to cameras of this type.

Figure 1:
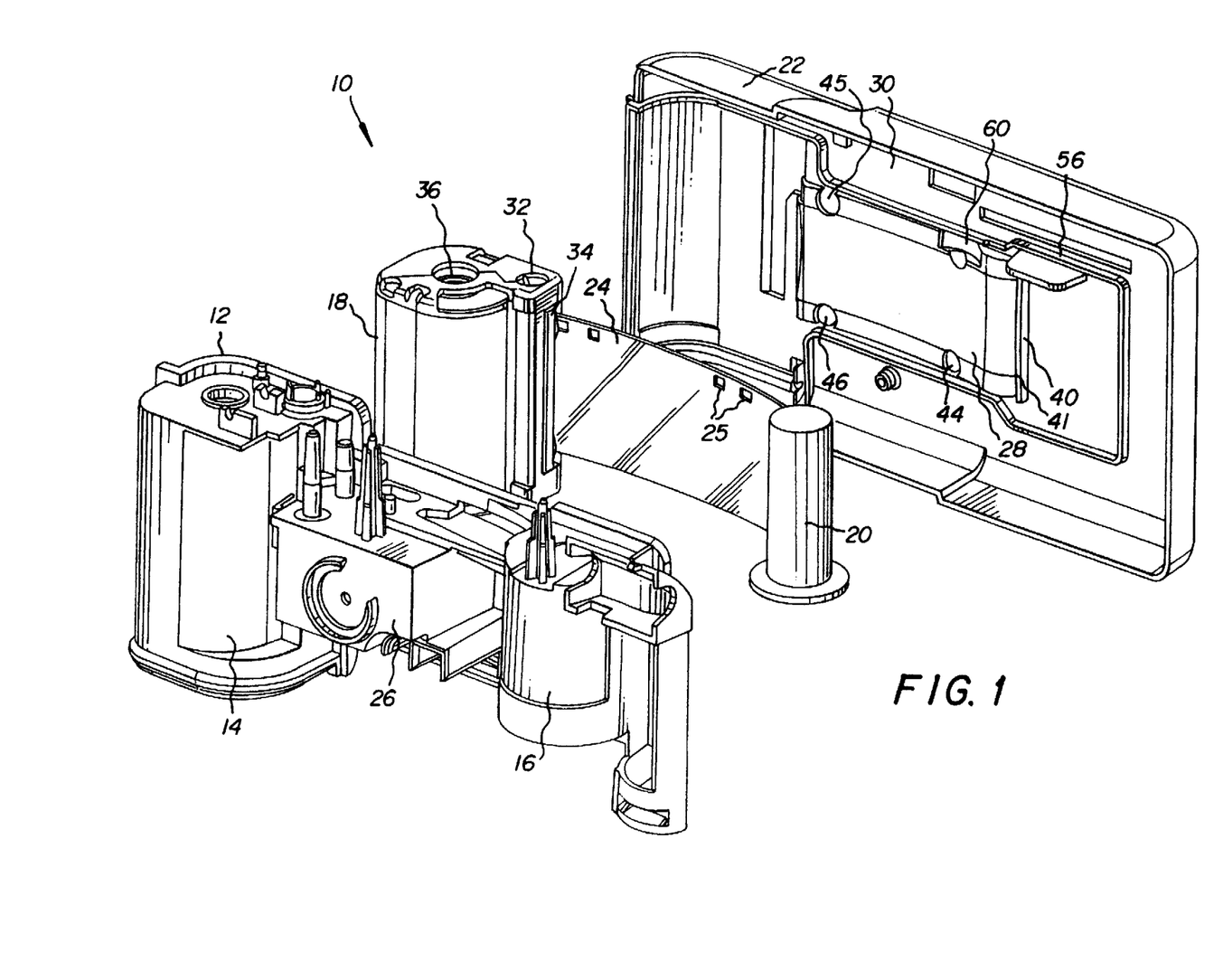
FIG. 1 is an exploded partial front perspective view of a camera made in accordance with a preferred embodiment of the present invention.

Beginning with the exploded perspective view of FIG. 1, a single-use or one-time use camera 10 is partially shown, including a plastic frame 12 which is used to support and maintain a number of photographic components, including a viewfinder, a taking lens, shutter mechanism, and film advance and metering mechanisms. The supported mechanisms relate to features which are commonly known in the field of photography and require no further discussion relative to the workings of the present invention. The frame 12 also includes a pair of chambers 14, 16 each being appropriately sized for receiving a film cartridge 18 and a film take-up spool 20, respectively, oppositely disposed relative to an exposure chamber 26 across which a filmstrip 24 is advanced. The film cartridge 18 and film spool 20 are each loaded into open rear sides of the respective chambers 14, 16 of the camera frame 12.

A rear cover 22, like the camera frame 12, is a plastic injection-molded component of the camera assembly which is fitted to the rear side of the frame 12 to lighttightly seal the camera 10. In actuality, the frame 12 is sandwiched between the rear cover 22 and a front cover, which is not shown in any of the FIGS. for the sake of clarity. The front and rear covers are attached by any convenient means, such as ultrasonic welding or by use of respective attachment members.

Figure 10:
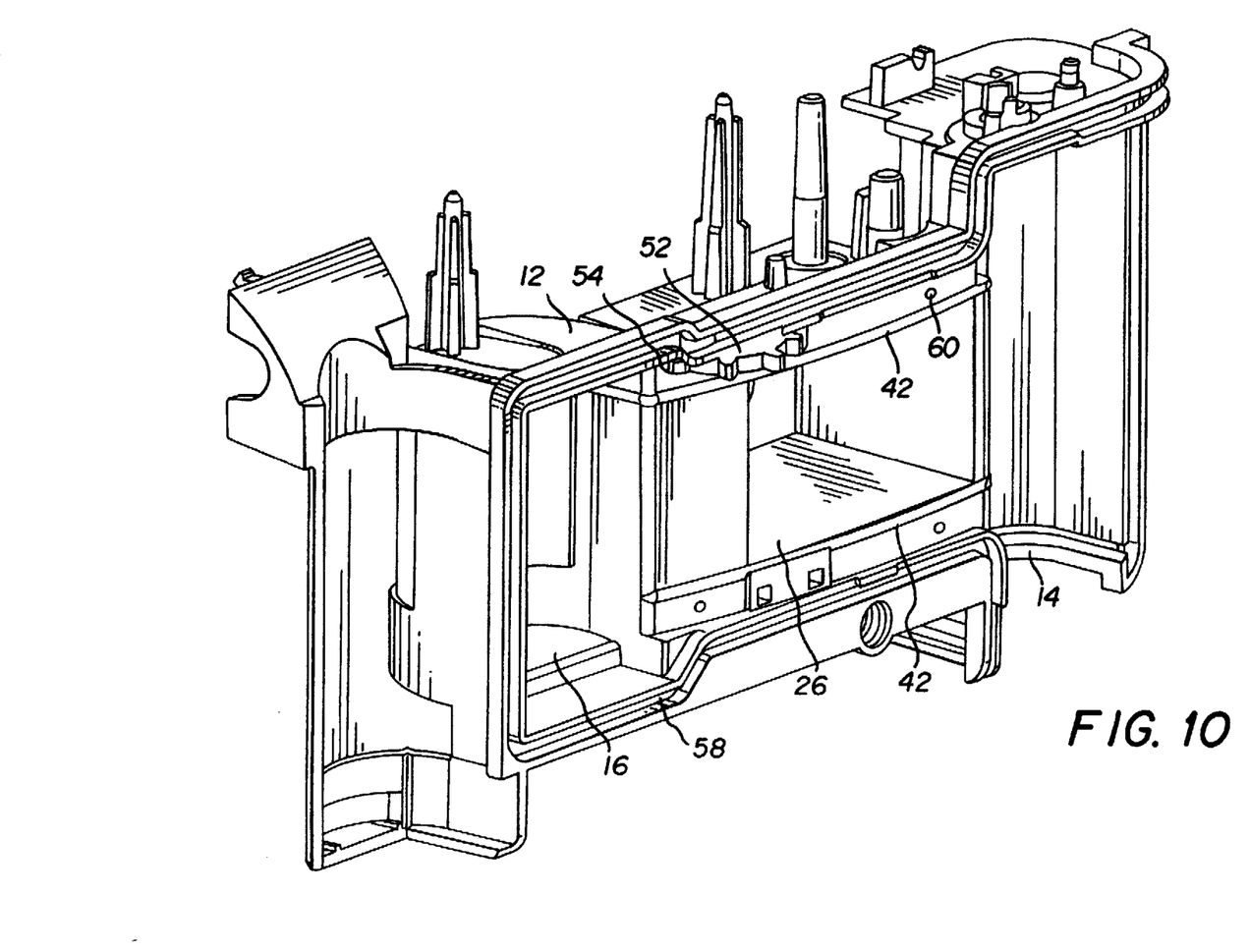
FIG. 10 is a partial rear perspective view of the camera frame of either FIG. 1 or FIG. 2, showing the exposure gate of the camera.

Referring to FIG. 10, the rear of the camera frame 12 is shown including the open side of the exposure chamber 26, which is bordered by a set of parallel film rails 42, used to guide non-photographic edges of the filmstrip 24 between the film roll chamber 16 and the film cartridge chamber 14. The open side of the exposure chamber 26 and the bordering film rails 42 are each curved in a convex manner outwardly from the camera frame 12 to define a curved film transport plane, as is commonly known in the field. Adjacent the film roll chamber 16, and above the upper film rail 42 is an opening 54 used to retain a rotatable sprocket wheel 52 for engaging perforations 25 in the filmstrip 24 for advancing the filmstrip across the exposure chamber 26.

Referring to FIGS. 1 and 10, the rear cover 22 of the camera 10 includes an interior surface 30 having disposed thereon a curved film platen 28 which corresponds, when assembled to the camera frame 12, to cover the open side of the exposure chamber 26. The curved film platen 28 has a curvature which is similar to that of the exposure chamber 26, FIG. 10, and bordering film rails 42, FIG. 10, and the curved exterior of the exposure chamber 26, FIG. 10, to define an appropriate film plane, as is commonly known.

In addition, interiorly disposed features are also provided for covering the open ends of the film roll chamber 16 and the film cassette chamber 16 when the rear cover 22 is assembled to complete the camera assembly. A light-sealing rib 56 projecting from the interior surface 30 of the rear cover engages a groove 58 which serves a boundary for the film roll chamber 16, exposure chamber 26, and film cartridge chamber 14 and provides a light seal when the rear cover 22 is assembled to the camera frame 12.

Referring to FIG. 1, the film cartridge or cassette 18, according to this described embodiment, is of the "thrusting-type" which includes a light-lock 32 which is engaged and rotated to enable a film door 34 to be opened in order to allow the filmstrip 24 to be thrust from the confines of the cassette by means of a rotatable film spool 36 contained within the cassette. Additional details relating to the film cassette 18 are described in U.S. Pat. No. 5,248,108, which is herein incorporated by reference. As will become apparent form the foregoing discussion, literally any type of cartridge, such as known 35 mm film magazines, can also be utilized. In fact, a cartridge is not essential to the workings of the present invention as the emphasis herein pertains to the type of filmstrip contained in some convenient manner in the camera which is advanced through an exposure gate.

Thus far, each of the described features of the camera 10 are commonly found in single-use cameras of the prior art. Using the above camera, a conventional filmstrip can be advanced between the film roll chamber 16 across the exposure chamber 26 to a film cartridge chamber 14 with the filmstrip remaining consistently within the curved film plane established by the film platen 28 and the bordering film rails 42 of the camera frame 12 with a reasonable contour throughout. The following discussion, however, relates to problems which develop when thinner forms of the filmstrip 24 are utilized.

Figure 2:
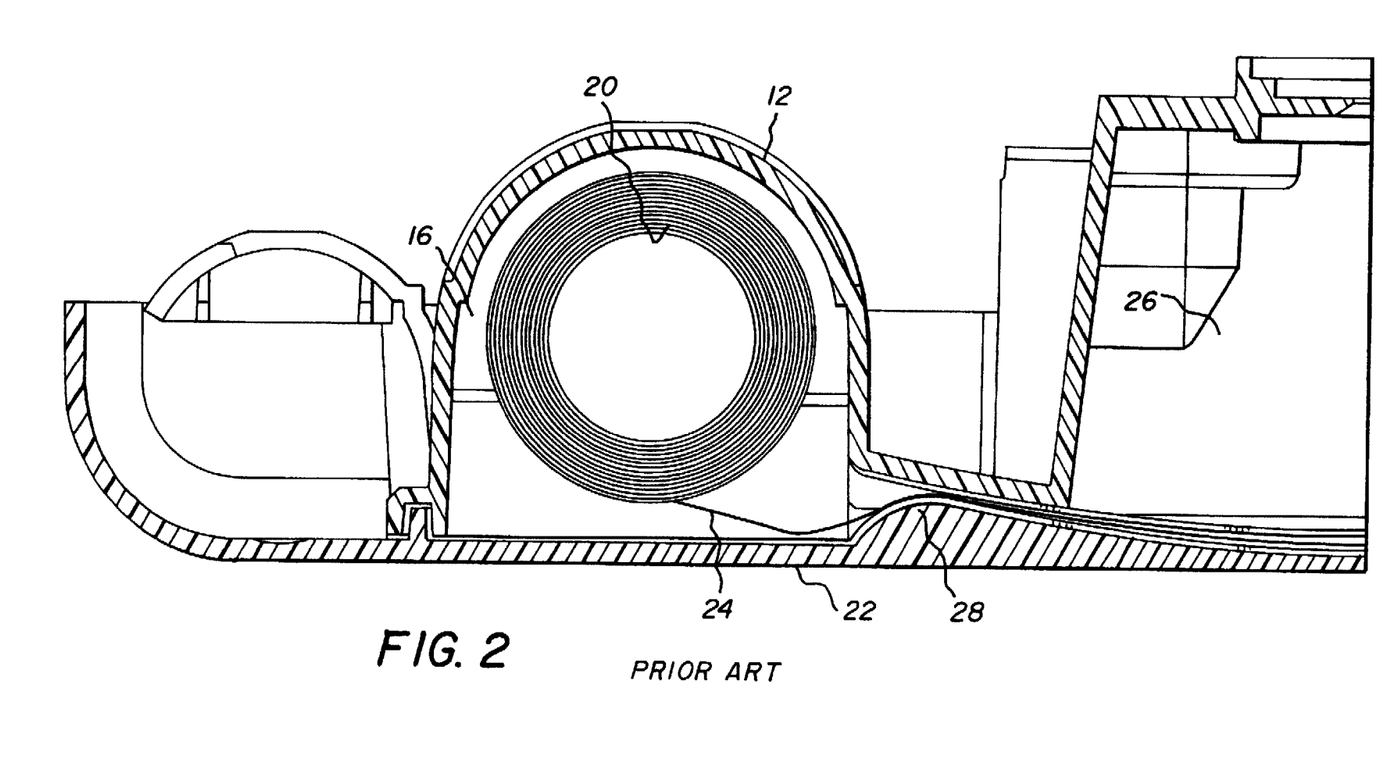
FIG. 2 is a partial top sectional view of a prior art camera.
Figure 3:
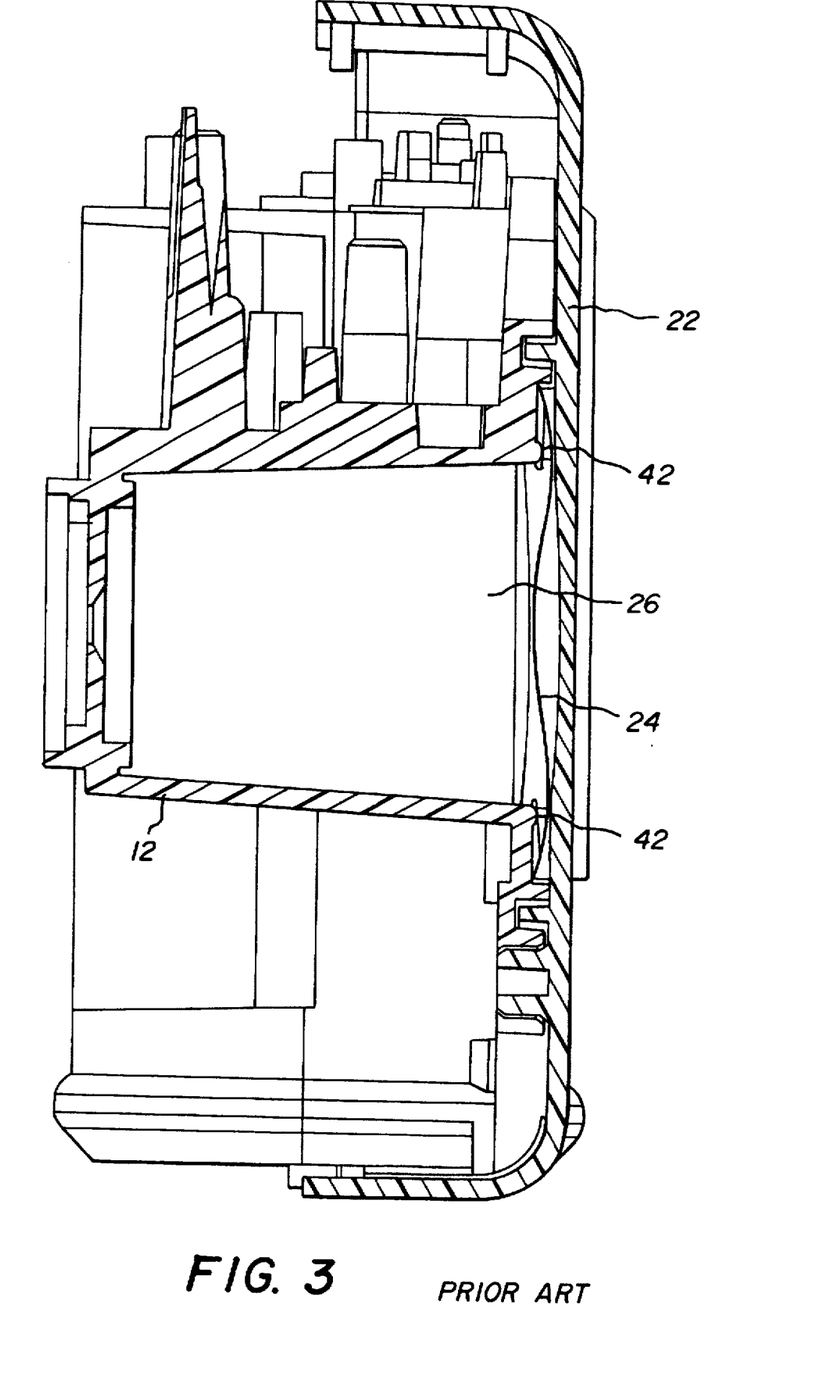
FIG. 3 is a side view of the prior art camera of FIG. 2, shown partially in section.
Figure 4:
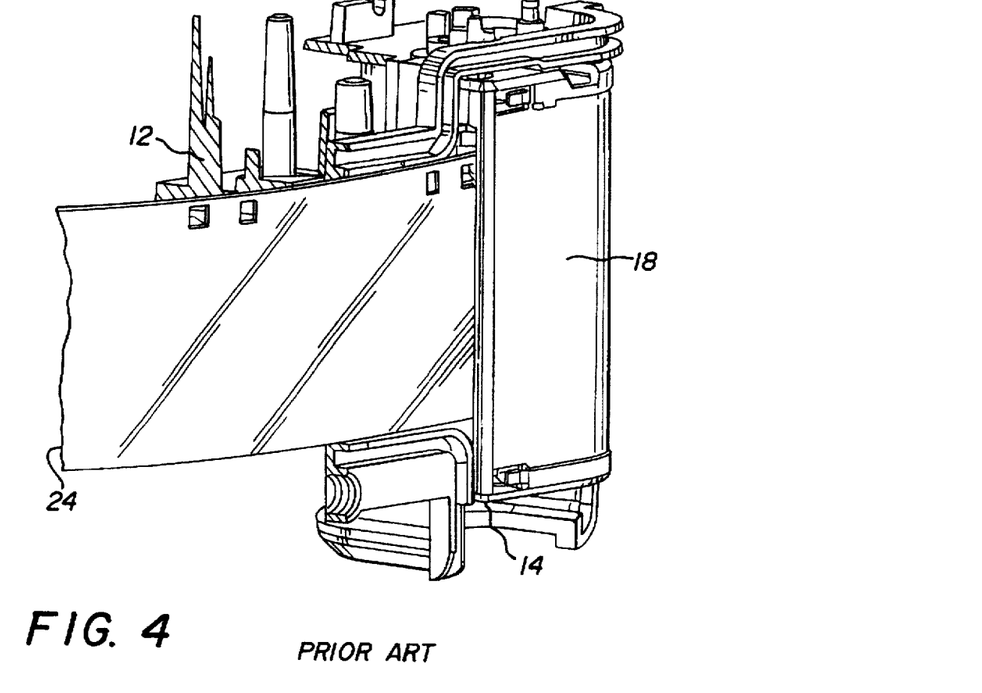
FIG. 4 is a partial rear perspective view of the prior art camera of FIGS. 2 and 3, with the rear cover removed showing a filmstrip having an uncorrected curvature which is advanced across an exposure chamber to a film cartridge chamber of the camera.

Referring to FIGS. 2–4, a prior art camera 10 is illustrated which utilizes a thinner filmstrip 24.

Specifically referring to the partially assembled view of the camera 10 illustrated in FIG. 2, the thinner form of filmstrip 24 is initially prewound in a known manner from the confines of the film cartridge 18 onto the film spool 20 where the film is wound in tension into a cylindrical roll. To prewind the film using the thrust cartridge 16, the light lock 32 is rotated and the film door 34 is opened. The filmstrip 24 which is originally contained in a cylindrical roll within the cartridge 16 is then thrust from the cartridge by rotating the rotatable film spool 36 in a film unwinding direction using a rotatable driver (not shown) or other apparatus. The filmstrip 24 is then cinched to the take-up spool 20 and the take-up spool is rotated to pull the filmstrip from the cartridge 18. The film prewinding operation can take place either inside or outside of the camera frame 12. In either event, the film spool 20 having the prewound filmstrip 24 is then contained within the film roll chamber 16 while a trailing end of the filmstrip 24 extends across the exposure chamber 26 and remains attached to the rotatable film spool 36 of the film cartridge 18, FIG. 1. Additional details as to the opening of the light lock and film door are described in the previously incorporated U.S. Pat. No. 5,248,108. According to this embodiment, the rear cover 22 is then attached to the rear of the camera frame 12 along with the front cover (not shown) to lighttightly seal the camera 10.

Use of a thinner form of filmstrip 24 produces a correspondingly lower rigidity in the filmstrip material. When the filmstrip 24 is initially wound under tension onto the rotatable film spool 36 of the cartridge, the filmstrip develops a preset deformation. This deformation is then further affected by prewinding of the filmstrip onto the take-up spool 20, producing a curvature in the filmstrip when the film is advanced between the film roll chamber back into the film cartridge chamber. As noted above, environmental factors, such as temperature and humidity, as well as time, make the curvature effect definable in a general but not wholly predictable manner as to contour as the filmstrip is advanced into the curved film plane of the camera 10.

As is seen from FIG. 2, when the thinner filmstrip 24 is advanced from the film roll chamber 16, such as by rotation of the sprocket wheel 52, FIG. 10, which engages the film perforations 25, the filmstrip 24 tends to peel away from the remainder of the cylindrical film roll toward the interior surface 30 of the rear cover 22 until the filmstrip 24 encounters the curved portion of the film platen 30 located in the space between the film roll chamber 16 and the exposure chamber 26.

Referring to FIG. 3, a partial sectional view is taken through the exposure chamber 26 to most clearly illustrate the curvature phenomena found with the thinner filmstrip 24 which contains an inward curvature at substantially the center of the width of the filmstrip. According to the conventions shown, "inward" is defined as toward the front of the exposure chamber 26. An enhanced view of the curvature of the filmstrip 24 is shown in the partial view of FIG. 4, with the rear cover removed for the sake of clarity.

Referring now to FIG. 1 and FIGS. 5-9, and with the preceding background of the prior art, the present invention can now be described. Similar parts are herein denoted with the same reference numerals for the sake of clarity in that the present invention utilizes the prior art camera 10.

The rear cover 22 includes a single rib member 40 projecting from the interior surface 30 which corresponds, when assembled to the camera frame 12, with the cavity of the film roll chamber 16. The convex rib member 40 extends in a direction which is perpendicular to the direction of film travel and has a length which is approximately equal to the width of the filmstrip 40. Preferably, the rib member 40 extends a distance from the interior surface 30, as seen most clearly in FIG. 5, which is approximately equal to the maximum projection of the curved film platen 28. The projected end 41 of the rib member 40 contains a radius for smoothly contacting the filmstrip 24 and for providing a frictional force, in the manner which is described below.

In addition, three (3) spherically shaped or contoured protrusions 44, 45, 46 also project from the interior surface 30 of the rear cover 22 for engagement with non-image capturing edge portions of the filmstrip 24. The three protrusions 44, 45, 46, according to this embodiment, as well as the convex rib member 40, are preferably molded-in features of the rear cover 22, though either could be separately added thereto. As to the location of the protrusions 44, 45, 46, relative to the camera frame 12, a pair of protrusions 44, 46 are located adjacent the bottom of the exposure chamber 26 and a single protrusion 45 is located adjacent the top of the exposure chamber, with each protrusion extending outside of the exposure chamber 26 in the vicinity of the film rails 42. Preferably, the spherical protrusions 44, 45, 46 are spaced as close tolerance-wise to the exposure frame area of the camera 10.

Figure 5:
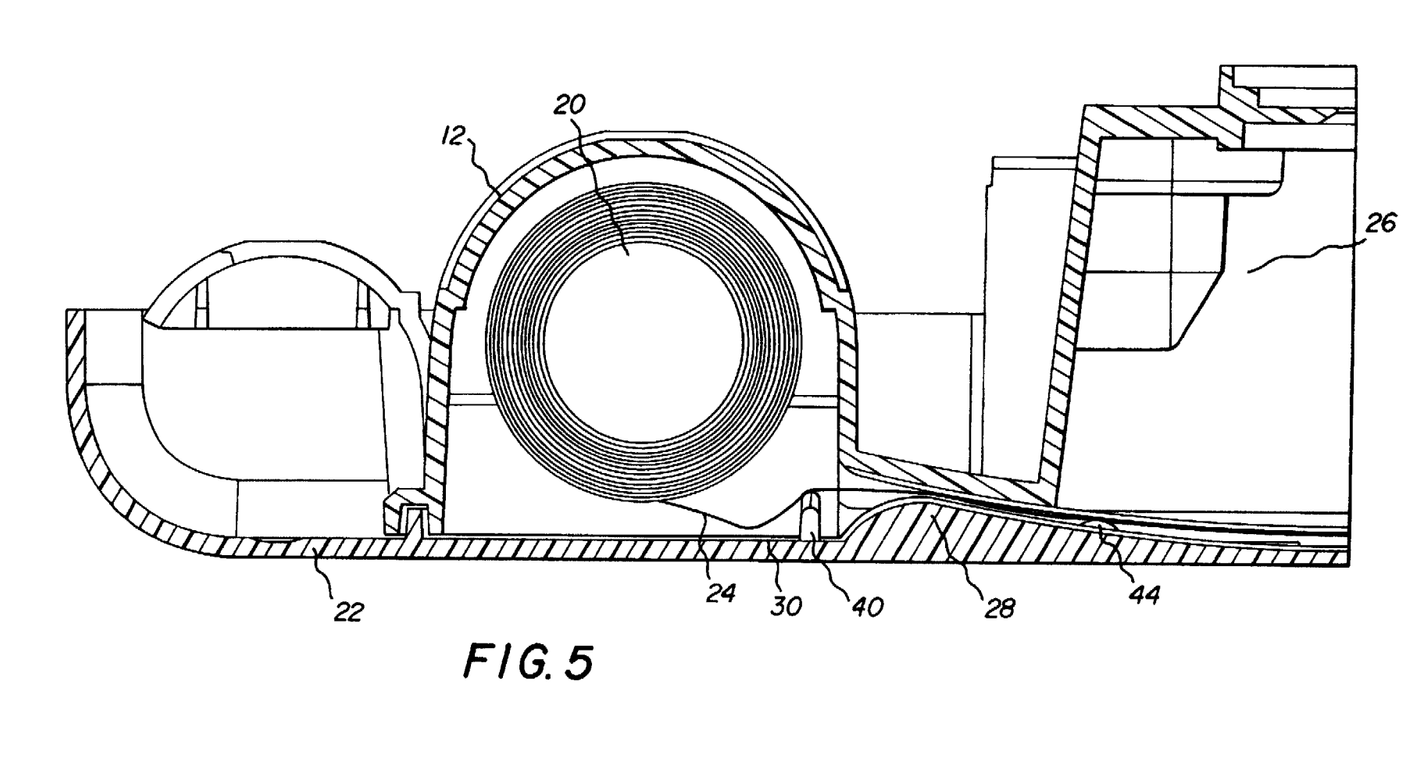
FIG. 5 is the partial top sectional view of the camera of FIG. 1 as contrasted with the prior art camera of FIG. 2.

Referring to FIG. 5 and as previously noted, the convex rib member 40 extends from the interior of the rear cover 22 into the space or cavity defining the film roll chamber 16, preferably adjacent the opening between the film roll chamber 16 and the interconnecting tunnel formed by the rear cover 22 and the portion of the camera frame 12 separating the exposure chamber 26.

Figure 6:
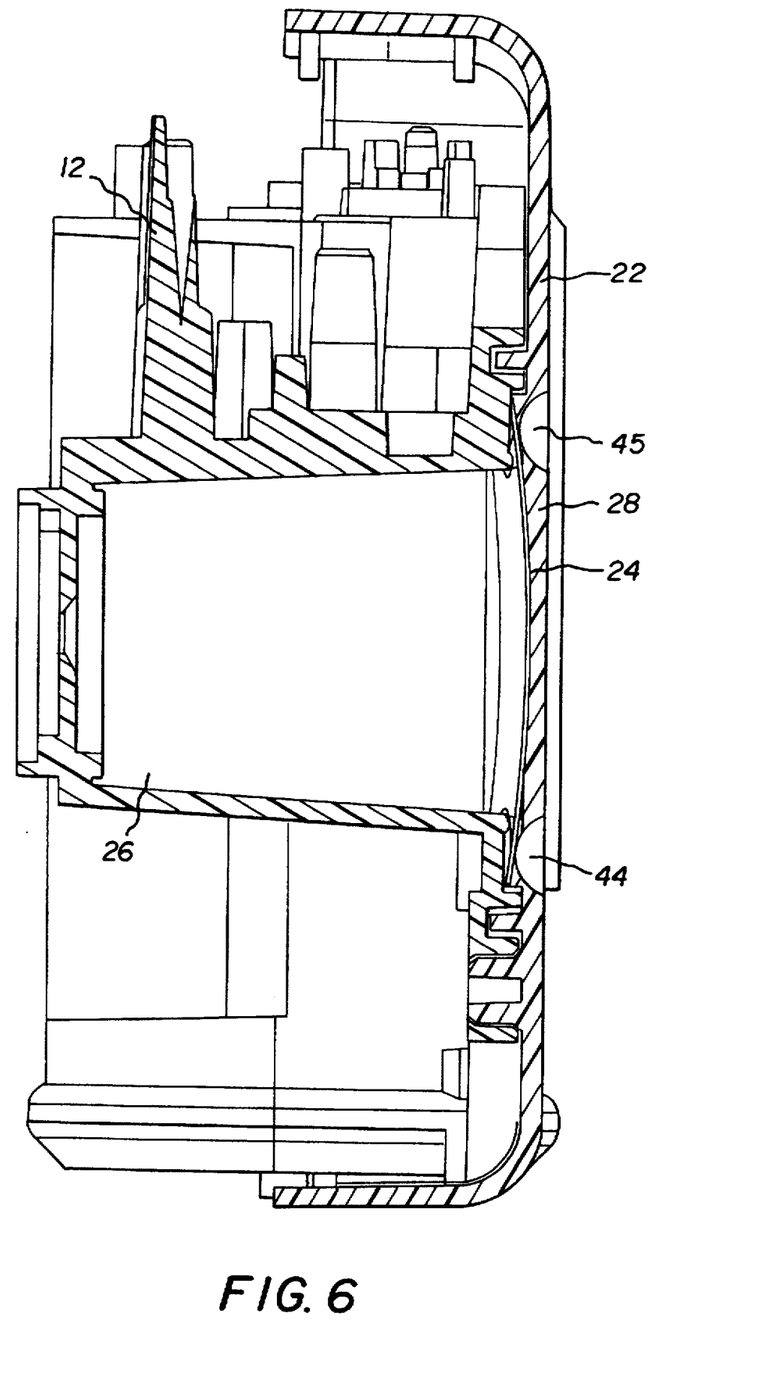
FIG. 6 is a side view of the camera of FIG. 1 and 5, as contrasted with the same view of the prior art camera of FIG. 3.
Figure 7:
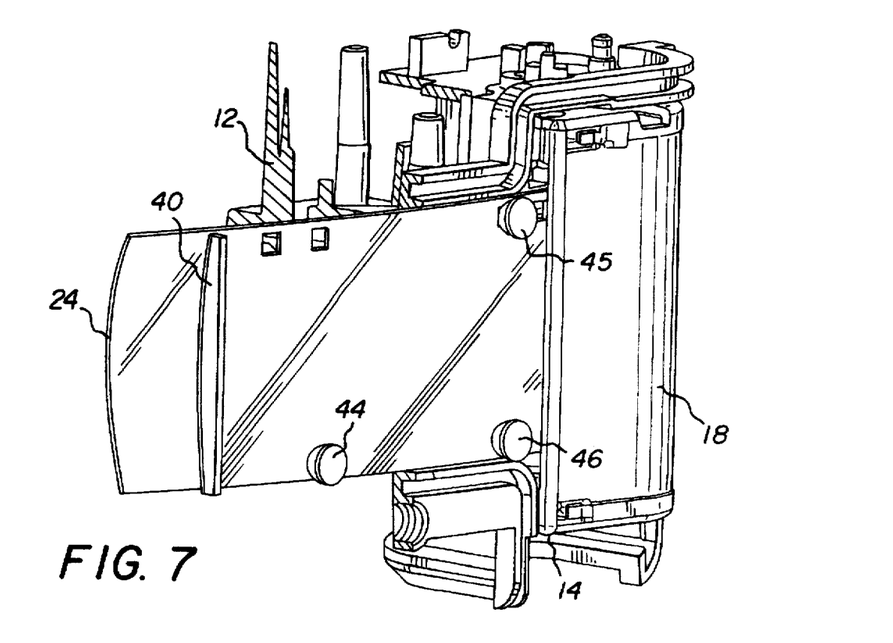
FIG. 7 is a partial rear perspective view of the camera of FIGS. 1, 5 and 6, as contrasted with the same view of the prior art camera of FIG. 4, showing the correction of curvature of a filmstrip advanced across a curved film plane in accordance with the present invention.

The rib member 40 performs a pair of specific functions. First, the member provides a negation of some of the peeling away action of the filmstrip 24 when separating from the cylindrical take-up spool 20, by contacting the filmstrip tends to flatten the filmstrip prior to the filmstrip entering the exposure chamber 26. Second, and perhaps more importantly, the convex shape of the rib member 40 breaks the variably concave center curvature of the filmstrip 24, thereby producing a more idealized film profile in the exposure chamber, as shown in FIGS. 6 and 7. As noted, the radius on the projected end 41 of the rib member 40 provides a frictional force, but allows the filmstrip 24 to enter the exposure gate with a minimum of scratching in the exposure areas of the filmstrip.

Figure 8:
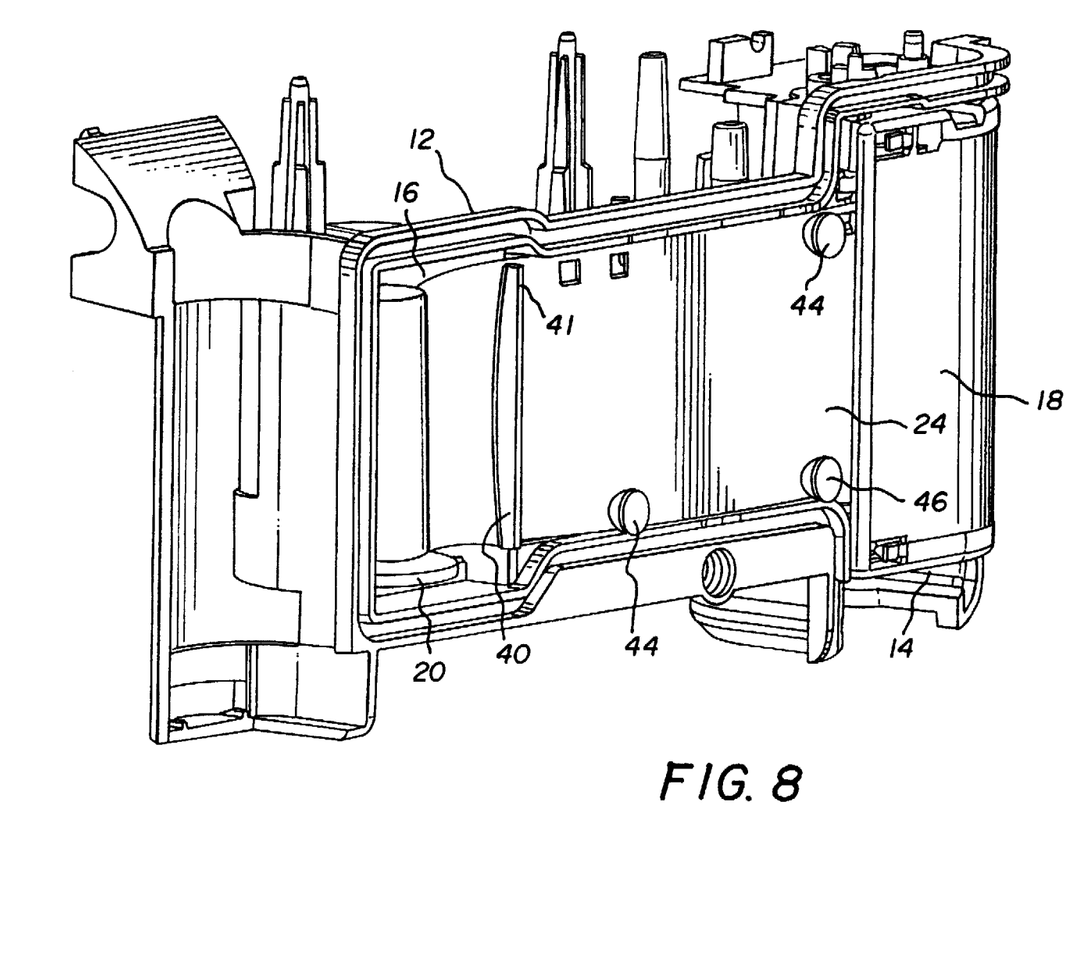
FIG. 8 is a partial rear perspective view of the camera of FIG. 7, without the rear cover, showing the relative placement of the film curvature correction means according to a preferred embodiment.
Figure 9:
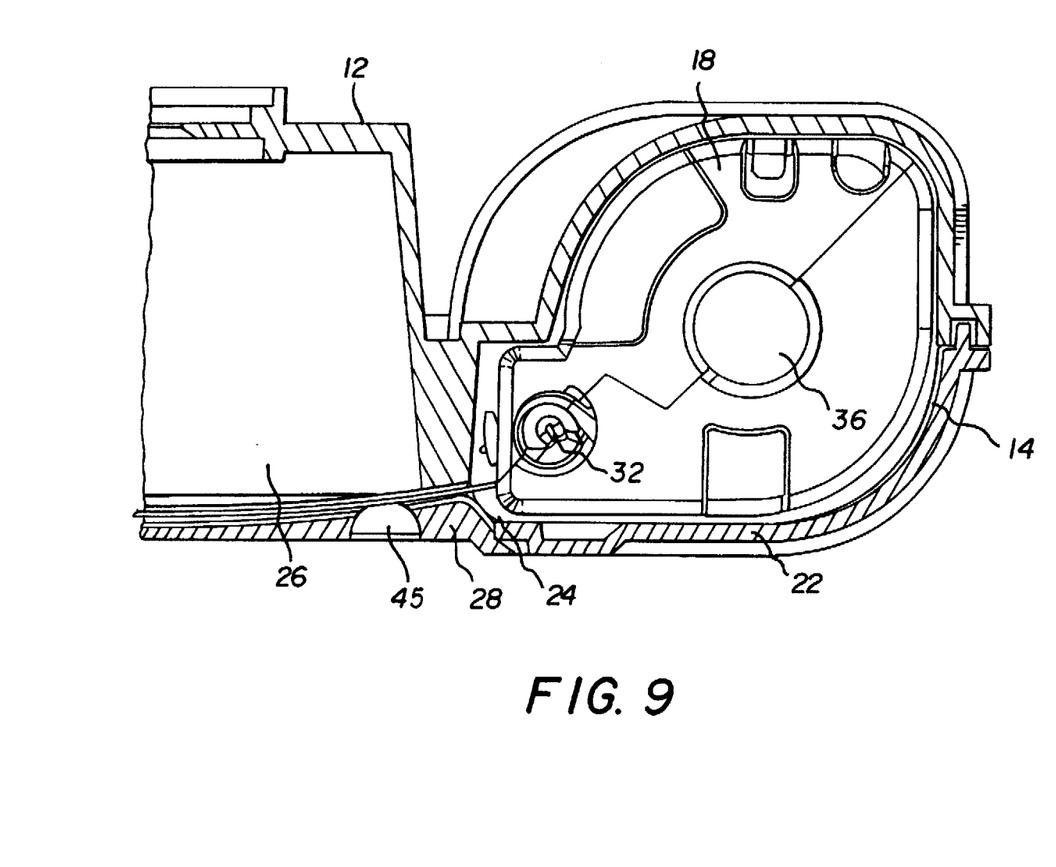
FIG. 9 is a partial top sectional view of the camera of FIGS. 7 and 8.

As a result of the filmstrip 24 contacting the rib member 40, the outer edges of the filmstrip 24 in the profile may tend to bow outwardly of the exposure chamber 26 as the concave curvature of the filmstrip is broken by the rib member 40, according to the conventions shown, and outwardly of the bordering film rails 42. Preferably, the spherical protrusions 44, 45, 46 are positioned to correspond with the corners of the rectangularly shaped open side of the exposure chamber 26, as shown in FIGS. 8 and 9, to allow the protrusions to engage the edges of the filmstrip 24 into contact with the bordering film rails 42 while the sprocket wheel 52 provides positive engagement with the perforations 25 of the advancing filmstrip in the remaining corner of the exposure frame.

Referring to FIGS. 1 and 10, the rear cover 22 also includes a groove 60 to accommodate the sprocket wheel 50 extending from the rear of the camera frame 12, and a set of tuning areas 62 which are local inward depressed portions in the camera frame 12 for contacting the spherical protrusions 44, 45, 46 to allow the protrusions to maintain contact with the filmstrip 24, but without excessive pressure into the film rails 42.

In summary, the convex rib member 40 engages the filmstrip 24 having a curvature similar to that shown most particularly in FIG. 4, causing the curvature of the filmstrip to be broken or bent in an opposite manner, thereby conforming at least in the center, to the shape of the rib member 40. The filmstrip 24, which is attached to the film spool 36 of the film cassette 20, is also made to conform at the edges in the exposure chamber 26 by the spherical protrusions 44 which are preferably located at the corners of the exposure frame in a non-image exposure capturing area of the filmstrip 24.

PARTS LIST FOR FIGS. 1-9

| | |
|---|---|
| 10 | camera |
| 12 | camera frame |
| 14 | film cassette chamber |
| 16 | film roll chamber |
| 18 | film cartridge |
| 20 | take-up spool |
| 22 | rear cover |
| 24 | filmstrip |
| 25 | perforations |
| 26 | exposure chamber |
| 28 | film platen |
| 30 | interior surface |
| 32 | light lock |
| 34 | film door |
| 36 | rotatable film spool |
| 38 | light sealing rib |
| 40 | curved rib member |
| 41 | projecting end |
| 42 | film rails |
| 44 | protrusion |
| 45 | protrusion |
| 46 | protrusion |
| 52 | sprocket wheel |
| 54 | opening |
| 56 | light-sealing rib |
| 58 | groove |
| 60 | groove |
| 62 | tuning areas |

The invention has been described with reference to a preferred embodiment. However, it will be appreciated that variations and modifications can be effected by a person of ordinary skill in the art without departing from the scope of the invention.

I claim:

1. A camera comprising a body having a film chamber, a film roll chamber for receiving a roll of film, and an exposure chamber disposed between said film roll chamber and said film chamber, said exposure chamber being bordered by a set of film rails for guiding the filmstrip between the film chamber and the film roll chamber, and a cover for lighttightly sealing said camera, wherein a roll of a photographic filmstrip is placed in said film roll chamber for advancement across said exposure chamber into said film chamber, said filmstrip having a variable curvature, is characterized by:

- film curvature correction means including a plurality of spherical protrusions projecting from an interior surface of said cover for contacting non-photographic image areas of said filmstrip and causing engagement of said filmstrip with said film rails for adopting a known film curvature when said filmstrip is advanced across said exposure chamber;
- said film chamber being sized to receive a film container, wherein one end of said film rolled in said film roll chamber is attached to a spool in said container;
- said camera including a curved rib member projecting from the interior surface of said cover into said film roll chamber for contacting a section of said filmstrip extending from said roll,
- said filmstrip being wrapped in an unexposed roll in said film roll chamber for advancing into a film cassette contained in said film chamber;
- said filmstrip extending from said film roll having a first curvature, said curved rib member having a second curvature substantially opposite in shape from said first curvature to cause said filmstrip to adopt said first curvature when said rib member contacts said extended portion of said filmstrip;
- said exposure chamber being defined by a substantially rectangular periphery and in which said spherical protrusions are arranged for contacting said film rails in at least three corners of said exposure chamber periphery for contacting non-photographic image areas of said filmstrip advancing between said protrusions and said film rails;
- said camera including a sprocket depending from said body having means for engaging perforations of said filmstrip for advancing the filmstrip from the film roll chamber to the film chamber, said sprocket extending from said body adjacent said film chamber in one of said corners of said exposure chamber periphery; and
- said film curvature correcting means including said curved rib member, said sprocket, and three spherical protrusions extending from said rear cover on three different corners corresponding to three corners of said exposure chamber periphery, said sprocket being located on a fourth corner.

2. A camera comprising a body having a film chamber, a film roll chamber for receiving a roll of film, and an exposure chamber disposed between said film roll chamber and said film chamber, said exposure chamber being bordered by a set of film rails for guiding the filmstrip between the film chamber and the film roll chamber, and a cover for lighttightly sealing said camera, wherein a roll of a photographic filmstrip is placed in said film roll chamber for advancement across said exposure chamber into said film chamber, said filmstrip having a variable curvature, is characterized by:

- a curved rib member projecting from the interior surface of said cover into said film roll chamber for contacting a section of said filmstrip extending from said roll;
- a sprocket extending from said body having means for engaging perforations of said filmstrip for advancing the filmstrip from the film roll chamber to the film chamber;
- a plurality of spherical protrusions projecting from an interior surface of said cover for contacting non-photographic image areas of said filmstrip and causing engagement of said filmstrip with said film rails for adopting a known film curvature when said filmstrip is advanced across said exposure chamber; and
- said exposure chamber being defined by a rectangular periphery wherein said spherical protrusions extend from said rear cover on three different corners and said sprocket is located on a fourth corner.

3. A camera as recited in claim 2, wherein said film chamber is sized to receive a film container, wherein one end of said film rolled in said film roll chamber is attached to a spool in said container.

4. A camera as recited in claim 2, wherein said filmstrip is wrapped in an unexposed roll in said film roll chamber for advancing into a film cassette contained in said film chamber.

5. A camera as recited in claim 4, wherein said filmstrip extending from said film roll has a concave curvature, and said curved rib member has a convex curvature.

* * * * *